United States Patent Office 2,952,681
Patented Sept. 13, 1960

2,952,681
PIPERAZINOALKYL SULFONES

Raymond M. Dodson, Park Ridge, Ill., assignor to G. D. Searle & Co., Chicago, Ill., a corporation of Delaware No Drawing. Filed May 1, 1959, Ser. No. 810,241

6 Claims. (Cl. 260—268)

The present invention relates to novel sulfones containing a heterocyclic nitrogen moiety and to intermediates in the manufacture of same. The former group of compounds is more specifically defined as consisting of α-{ω-[4-(ω-hydroxyalkyl)piperazino]alkyl}benzyl hydrocarbon sulfones and their esters, and can be represented by the structural formula

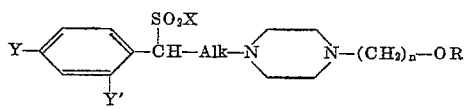

wherein Alk is an alkylene radical containing fewer than 6 carbon atoms, $n$ is a positive integer greater than one and less than 4, R is selected from the group consisting of hydrogen and lower alkanoyl radicals, X is a hydrocarbon radical containing fewer than 8 carbon atoms, and Y and Y' are selected from the group consisting of hydrogen and halogens.

Alkylene radicals represented by Alk are exemplified by

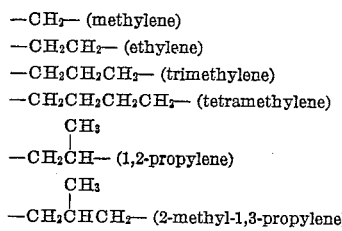

The term "lower alkanoyl" as represented by R encompasses, for example, formyl, acetyl, propionyl, butyryl, valeryl, caproyl, enanthyl, caprylyl, and branched-chain isomers of the foregoing, said groups being the acyl radicals of alkanoic acids containing fewer than 9 carbon atoms.

The hydrocarbon radicals encompassed by X are exemplified by methyl, ethyl; straight- and branched-chain-propyl, butyl, pentyl, hexyl, heptyl; and cyclopentyl, cyclohexyl, phenyl, benzyl, and tolyl.

Preferred embodiments of this invention are the α-{ω-[4-(ω-hydroxyalkyl)piperazino]alkyl}benzyl phenyl sulfones and lower alkanoates thereof which can be manufactured, for example, from α-cyanobenzyl phenyl sulfone. The latter is treated with an α,ω-dihaloalkane in the presence of a suitable acid acceptor to afford the corresponding α-cyano-α-(ω-haloalkyl)benzyl phenyl sulfone. Reacting the latter with an N-(ω-hydroxyalkyl)piperazine in the presence of a suitable acid-neutralizing agent affords an α-cyano-α-{ω-[4-(ω-hydroxyalkyl)piperazino]alkyl}benzyl phenyl sulfone. The latter nitrile is cleaved, for example by treatment with an aqueous solution of potassium hydroxide in ethanol, to yield the corresponding α-{ω-[4-(ω-hydroxyalkyl)piperazino]alkyl} benzyl phenyl sulfone. The specified process is exemplified by the following sequence of reactions. α-cyanobenzyl phenyl sulfone is reacted with 1,3-dibromopropane and an aqueous solution of potassium hydroxide in ethanol to yield α-(3-bromopropyl)-α-cyanobenzyl phenyl sulfone. Reaction of the latter with N-(2-hydroxyethyl)piperazine results in α-cyano-α-{3-[4-(2-hydroxyethyl)piperazino]propyl}benzyl phenyl sulfone. Cleavage of this nitrile, for example by reaction with aqueous potassium hydroxide in ethanol, results in α-{3-[4-(2-hydroxyethyl)piperazino]propyl}benzyl phenyl sulfone.

The latter sulfones can be reacted with a lower alkanoic acid anhydride in a suitable acid acceptor to afford the corresponding lower alkanoate. As a specific example, the aforementioned α-{3-[4-(2-hydroxyethyl)piperazino]propyl}benzyl phenyl sulfone is reacted with acetic anhydride to afford α-{3-[4-(2-acetoxyethyl)piperazino]propyl}benzyl phenyl sulfone.

The α-{ω-[4-(ω-hydroxyalkyl)piperazino]alkyl}benzyl phenyl sulfones and corresponding lower alkanoates of this invention are useful as the result of their valuable pharmacological properties. They have, for example, anti-inflammatory activity as evidenced by their ability to inhibit the local edema formation associated with inflammatory states. They are also central nervous system depressants.

The α-cyano-α-{ω-[4-(ω-hydroxyalkyl)piperazino]alkyl}benzyl phenyl sulfones of this invention are useful as result of their ability to serve as intermediates in the preparation of the corresponding instant cleavage products. The cyano compounds have the ability also to potentiate the sleep-producing activity of barbiturate sedatives.

The invention will appear more fully from the examples which follow. These examples are set forth by way of illustration only and it will be understood that the invention is not to be construed as limited in spirit or in scope by the details contained therein, as many modifications in materials and methods will be apparent in this disclosure to those skilled in the art. In these examples temperatures are given in degrees centigrade (° C.). Quantities of materials are expressed in parts by weight unless otherwise noted.

EXAMPLE 1

*α-(3-bromopropyl)-α-cyanobenzyl phenyl sulfone*

A mixture of 48.4 parts of α-cyanobenzyl phenyl sulfone, 80.8 parts of 1,3-dibromopropane, 11.2 parts of potassium hydroxide and 400 parts of ethanol is heated at reflux for 3 hours; cooled, diluted with water, and steam-distilled to remove excess dibromide. The resulting mixture is cooled and the gummy precipitate collected by filtration and dissolved in ether. The ether extract is washed successively with 5% aqueous sodium hydroxide and water, dried over anhydrous sodium sulfate, and evaporated to dryness in vacuo. The residue is crystallized from n-hexane to afford α-(3-bromopropyl)-α-cyanobenzyl phenyl sulfone, M.P. 99–101°.

By substituting an equivalent quantity of 1,2-dibromoethane and otherwise proceeding according to the herein described processes, α-(2-bromoethyl)-α-cyanobenzyl phenyl sulfone, M.P. about 102°, is obtained.

EXAMPLE 2

*α-cyano-α-{3-[4-(2-hydroxyethyl)piperazino]propyl} benzyl phenyl sulfone*

A mixture of 7.18 parts of α-(3-bromopropyl)-α-cyanobenzyl phenyl sulfone and 43 parts of N-(2-hydroxyethyl)piperazine is heated on the steam bath for 30 minutes, then allowed to stand at room temperature for 3 days. The mixture is diluted with water then warmed on the steam bath for one hour, cooled and filtered to remove the precipitated crude product. The filter cake is washed with water and recrystallized from acetone to afford α-cyano-α-{3-[4-(2-hydroxyethyl)-piperazino]propyl}benzyl phenyl sulfone, M.P. 154–156°.

EXAMPLE 3

*α-cyano-α-{2-[4-(3-hydroxypropyl)piperazino]ethyl} benzyl phenyl sulfone*

By substituting α-(2-bromoethyl)-α-cyanobenzyl phenyl sulfone and N-(3-hydroxypropyl)piperazine in the procedure described in Example 2 and heating on the steam bath for 3 days, α-cyano-α-{2-[4-(3-hydroxypropyl)piperazino]ethyl}benzyl phenyl sulfone is obtained. This substance exhibits maxima in the infrared at 3.08, 3.4, 3.55, 7.5, 7.6 and 8.65 microns.

EXAMPLE 4

*α-{3-[4-(2-hydroxyethyl)piperazino]propyl}benzyl phenyl sulfone*

To a solution of 2 parts of α-cyano-α-{3-[4-(2-hydroxyethyl)piperazino]propyl}benzyl phenyl sulfone in 40 parts of ethanol is added a solution of 4 parts of potassium hydroxide in 20 parts of water and the mixture heated at reflux for 13 hours. It is then cooled, diluted with water, and extracted with methylene chloride. The organic extract is dried over anhydrous sodium sulfate and concentrated to dryness under reduced pressure resulting in a residue which is recrystallized successively from acetone and acetone-cyclohexane to afford pure α-{3-[4-(2-hydroxyethyl)piperazino]propyl}benzyl phenyl sulfone, M.P. 114.5–115°.

By substituting α-cyano-α-{2-]4-(3-hydroxypropyl)piperazino]ethyl}benzyl phenyl sulfone and otherwise proceeding according to the herein described processes, α-{2-[4-(3-hydroxypropyl)piperazino]ethyl}benzyl phenyl sulfone, whose infrared absorption spectrum possesses maxima at 2.9, 3.4, 3.55, 7.7, and 8.8 microns, is obtained.

EXAMPLE 5

*α-{3-[4-(2-acitoxyethyl)piperazino]propyl}benzyl phenyl sulfone*

A mixture of 5 parts of α-{3-[4-(3-hydroxyethyl)piperazino]propyl}benzyl phenyl sulfone, 50 parts of acetic anhydride and 5 parts of sodium acetate is heated on the steam bath for 16 hours. The reaction mixture is diluted with water, neutralized with dilute sodium hydroxide, and the resulting precipitate collected by filtration and dried to afford α-{3-[4-(2-acetoxyethyl)piperazino]propyl}benzyl phenyl sulfone, whose infrared absorption spectrum exhibits maxima at 3.4, 3.55. 5.75, 7.7, 8.0, and 8.8 microns.

By substituting an equivalent quantity of butyric anhydride and otherwise proceeding according to the herein described processes, α-{3-[4-(2-butyroxyethyl)piperazino]propyl}benzyl phenyl sulfone is obtained. This substance displays maxima in the infrared at 3.4, 3.55, 5.78, 7.7, 8.3, and 8.8 microns.

What is claimed is:

1. A compound of the structural formula

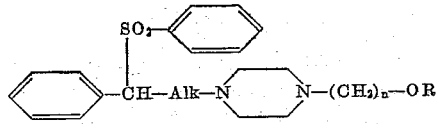

wherein Alk is an alkylene radical containing fewer than 6 carbon atoms, $n$ is a positive integer greater than one and less than 4, and R is selected from the group consisting of hydrogen and lower alkanoyl radicals.

2. A compound of the structural formula

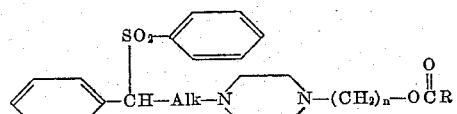

wherein Alk is an alkylene radical containing fewer than 6 carbon atoms, $n$ is a positive integer greater than one and less than 4, and R is a lower alkyl radical.

3. A compound of the structural formula

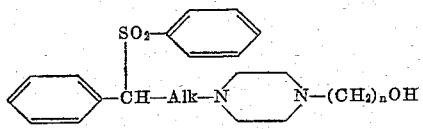

wherein Alk is an alkylene radical containing fewer than 6 carbon atoms and $n$ is a positive integer greater than one and less than 4.

4. α-{3-[4-(2-hydroxyethyl)piperazino]propyl}benzyl phenyl sulfone.

5. A compound of the structural formula

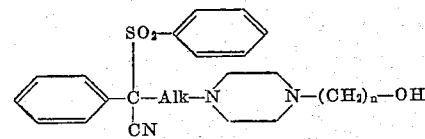

wherein Alk is an alkylene radical containing fewer than 6 carbon atoms and $n$ is a positive integer greater than one and less than 4.

6. α-cyano-α-{3-[4-(2-hydroxyethyl)piperazino]propyl}benzyl phenyl sulfone.

No references cited.